United States Patent [19]
Ikeda et al.

[11] Patent Number: 5,375,680
[45] Date of Patent: Dec. 27, 1994

[54] CHECK-OUT DEVICE

[75] Inventors: Tsutomu Ikeda, Numazu; Hiromasa Akita, Shizuoka, both of Japan

[73] Assignee: Tokyo Electric Co., Ltd., Tokyo, Japan

[21] Appl. No.: 19,859

[22] Filed: Feb. 19, 1993

[30] Foreign Application Priority Data

Feb. 24, 1992 [JP] Japan .................................. 4-036064
Mar. 18, 1992 [JP] Japan .................................. 4-061987

[51] Int. Cl.$^5$ .............................................. A47F 9/04
[52] U.S. Cl. ...................................... 186/61; 235/383
[58] Field of Search .................. 186/61; 177/50; 235/383

[56] References Cited

U.S. PATENT DOCUMENTS

| | | | |
|---|---|---|---|
| 4,365,148 | 12/1982 | Whitney | 235/383 |
| 4,373,133 | 2/1983 | Clyne et al. | 235/383 |
| 4,676,343 | 6/1987 | Humble et al. | 186/61 |
| 4,792,018 | 12/1988 | Humble et al. | 186/61 |
| 5,178,234 | 1/1993 | Sakurai et al. | 186/61 |

*Primary Examiner*—F. J. Bartuska
*Attorney, Agent, or Firm*—Frishauf, Holtz, Goodman & Woodward

[57] ABSTRACT

A check-out device includes an input section for inputting an article code recorded on an article, an entry conveyor for conveying an article put thereon after the article code is input, a weighing device for measuring the weight of the article put on the entry conveyor, an electronic cash register storing reference weights assigned to various articles along with article codes assigned to the various articles, for comparing the weight measured by the weighing device with reference weight of an article corresponding to the input article code, and performing registration and settlement of the article corresponding to the input article code when it is detected from a result of comparison that the article corresponding to the input article code is identical to one put on the entry conveyor. Particularly, the check-out device further includes a processing section for inhibiting a next article code from being input at least during a period from when the article code has been input until the article put on the entry conveyor is removed.

8 Claims, 6 Drawing Sheets

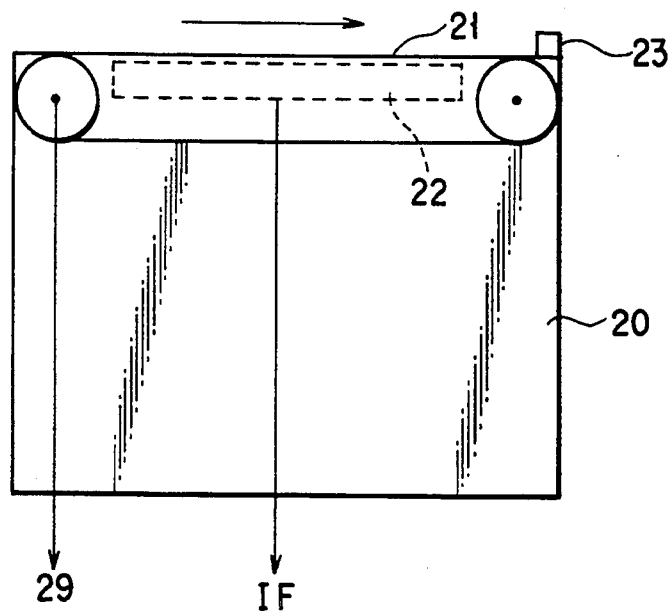
F I G. 2
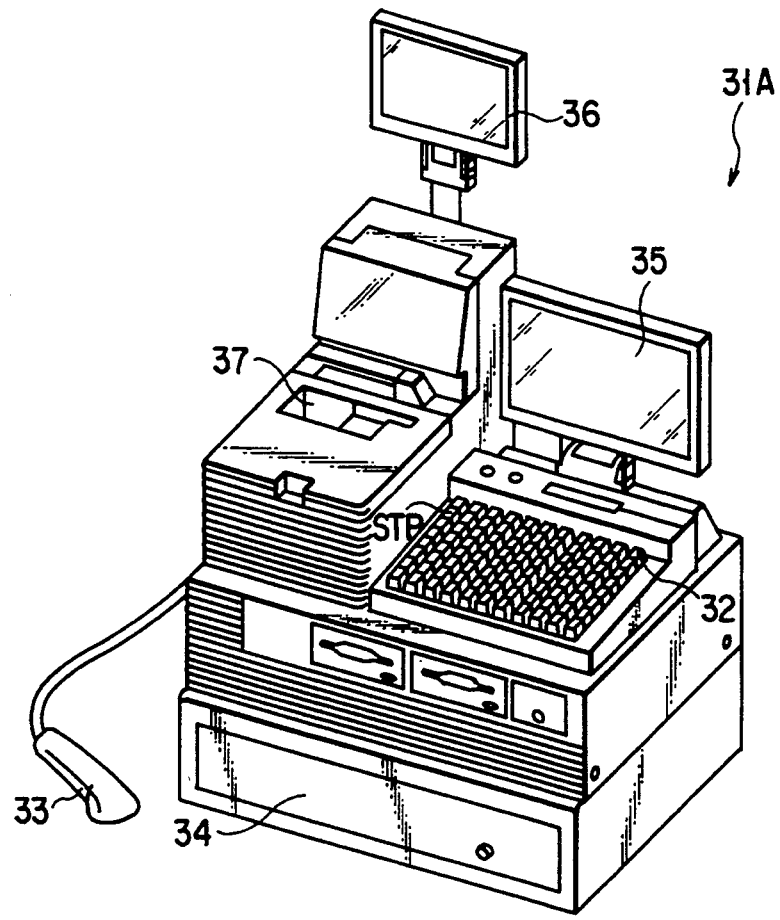
F I G. 3

| ARTICLE CODE | ARTICLE NAME | UNIT PRICE | REFERENCE WEIGHT (DR) |
|---|---|---|---|
|  |  |  |  |
|  |  |  |  |
|  |  |  |  |
|  |  |  |  |
|  |  |  |  |
|  |  |  |  |
|  |  |  |  |
CGA
F I G. 5
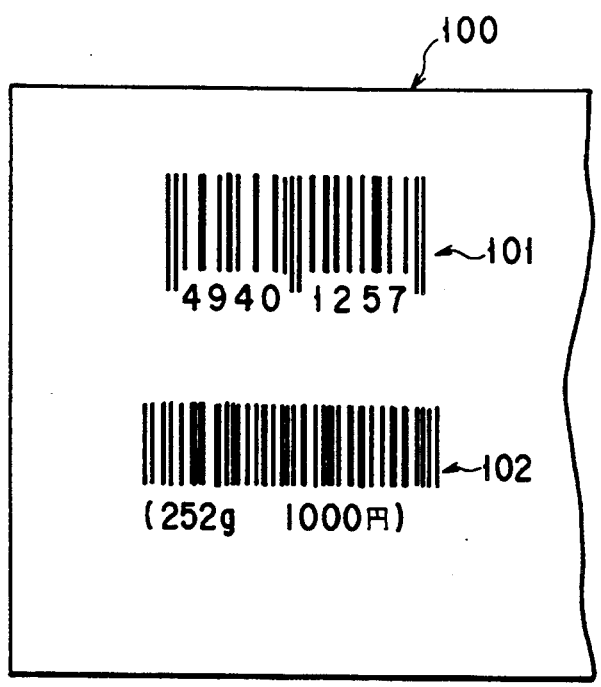
F I G. 6

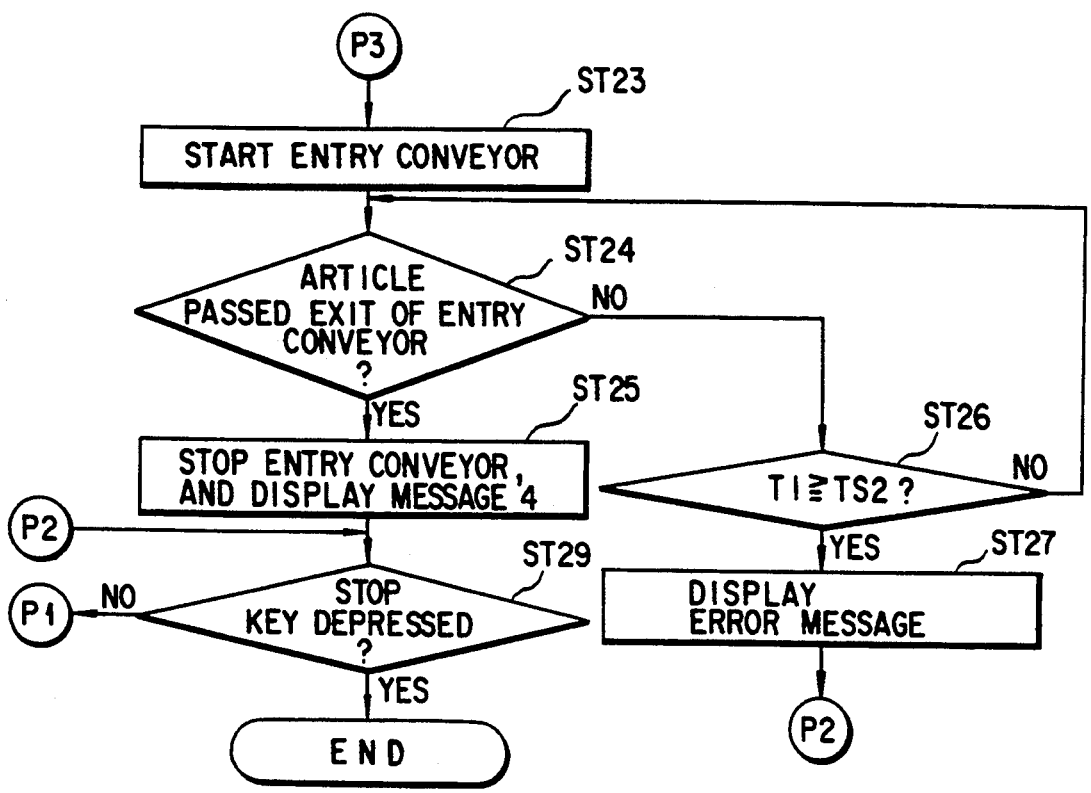
F I G. 7B

CHECK-OUT DEVICE

BACKGROUND OF THE INVENTION

1. Field of the Invention

This invention relates generally to a check-out device that performs registration of articles to be purchased according to article codes recorded in a mechanically readable form on the articles, and more particularly to a check-out device in which a customer participates a process of entering the article codes.

2. Description of the Related Art

A check-out device is installed, for example, as a self-service check-out counter at a supermarket. A customer puts articles he or she wishes to purchase in a shopping cart, pushes the cart to an input section of the check-out device, and depresses a start button on an operator panel of the input section to register the articles. Then, the customer takes out an article from the cart, sets it in front of a scanner (i.e., an article-code reader) for entering an article code by scanning, and then puts iron the entry conveyor arranged on an electronic weighing device. The scanner optically scans the article to read the article code recorded on the article generally in a bar-code form, and supplies the read article code to an electronic cash register. The electronic weighing device measures the weight of the article on the entry conveyor and supplies a result of the measurement as measured weight data to the electronic cash register. The electronic cash register has an article data table containing article data of all the articles for sales, each data item being composed of, for example, an article code, an article name, a unit price, and a reference weight. The electronic cash register uses the read article code, the measured weight data, and the article data table in order to confirm that an article whose article code is read by the scanner is on the entry conveyor, and the read article code in order to register the article as a purchased article after the confirmation. On the other hand, the article is fed from the entry conveyor to an outfeed conveyor after the confirmation, and further fed to a bagging area by the outfeed conveyor.

After scanning of all the articles to be purchased, the customer depresses a stop button on the operator panel to finish registration of the articles. At this time, the electronic cash register performs settlement for the registered articles based on the article data stored in the article data table. The cashier informs the customer of the total amount of the registered articles obtained in the settlement and stores cash paid by the customer in a drawer of the electronic cash register. After the payment, the customer puts the articles stocked on the bagging area into a bag and leaves the counter.

The above conforming operation is performed each time the electronic weighing device has completed the measurement of the article weight. In this operation, the electronic cash register receives the measured weight data from the electronic weighing device and the read article code from the scanner, and checks to see if the read article code is correct. When the article code is detected to be correct, the measured weight data is compared with the reference weight data of an article identified by the article code. When it is detected that the measured weight data coincides with the reference weight data, the article is registered as a purchased article, using the read article code. This article registration is not carried out if difference is detected. Instead, the entry and the outfeed conveyors are stopped, and then, a message requesting to put the article whose article code has been read on the entry conveyor.

In the aforementioned check-out device, a customer takes a task of inputting article codes with the scanner, whereas a cashier takes a task of operating the cash register to process the input article codes. This shortens the time during which the customer is kept waiting without anything to do, as compared with a case where the cashier takes a task of not only inputting the article codes but also operating the cash register. The load on the cashier is reduced as a result of the customer's cooperation. Use of a scanner eliminates article code input errors that would take place in operating keys to input the article codes. Therefore, this greatly helps customers waiting at the counter to avoid forming a long queue. Further, since the comparison of the weight data items is performed to check to see if an article whose article code has been read is the same as that on the entry conveyor is checked, a dishonest practice by the customer could be prevented. Published Unexamined Japanese Patent Application No. 61-46591 discloses a check-out device similar to that as described above.

Conventional check-out devices have the drawbacks that prevent smooth, quick check-out.

Specifically, the scanner is generally kept in an operable state during the period from when the start button has been depressed to read the article codes from the articles sequentially set in front of the scanner until the stop button is depressed. If the customer skillfully sets the articles one after another in front of the scanner and puts them on the entry conveyor, a subsequent article can be put on the entry conveyor before the electronic weighing device has finished weighing the article now on the entry conveyor. Should this happen, the electronic weighing device produces incorrectly measured weight data indicating the sum of the weight of an article and a subsequent article. Accordingly, due to a difference between the measured weight data and the reference weight data, the article cannot be registered even though it is put on the entry conveyor after the article code thereof has been read.

Further, as for meter-rate priced articles, such as meat, sold at a price of the unit price multiplied by the weight, it is impossible to preset in the article data table the reference weight data covering all variations of article weight. To prevent the aforementioned dishonest practice in registering articles, the cashier must input the article codes of meter-rate priced articles instead of the customer. This, however, reduces the efficiency of the article registration and settlement job.

Even if the weight of a meter-rate priced article is determined, and the reference weight data indicating the determined weight is preset in the article data table, the reference weight data does not always coincides with the measured weight data. For instance, meat or slices of fish are placed on a styrene foam tray of a reasonable size, and wrapped with a transparent film. Small rice crackers are put in a plastic bag. That is, the total weight of the meter-rate priced article varies with the weight of a packaging material added to the net weight of the article. Accordingly, there is a possibility that a meter-rate priced article cannot be registered due to a difference between the measured weight data and the reference weight data.

SUMMARY OF THE INVENTION

The object of the present invention is to provide a self-service check-out device capable of enhancing its popularization.

The foregoing object is accomplished by providing a check-out device comprising: an input section for inputting an article code recorded on an article; a conveyor section for conveying an article put thereon after the article code is input; a weighing section for measuring the weight of the article put on the conveyor section; a cash register having reference weights assigned to various articles stored along with article codes assigned to the various articles, for comparing the weight measured by the weighing section with reference weight of an article corresponding to the input article code, and performing registration and settlement of the article corresponding to the input article code when it is detected from a result of comparison that the article corresponding to the input article code is identical to one put on the conveyor section; and a processing unit for inhibiting a next article code from being input at least during a period from when the article code has been input until the article put on the conveyor section is removed.

According to this check-out device, the processing unit inhibits a next article code from being input at least during a period from when the article code has been input until the article put on the conveyor section is removed. Since input of the next article code is accepted after the article on the conveyor section has been removed, it is possible to avoid two or more articles from being put on the conveyor section and weighed simultaneously. Therefore, so far as an article whose article code has been input is put on the conveyor section, a result of the weight measurement would not prevent registration of the article.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a view for explaining the construction of an entry section shown in FIG. 1;

FIG. 3 is a perspective view of the cash register shown in FIG. 1;

FIG. 5 is a memory map of an article data table stored in the RAM shown in FIG. 4;

FIG. 6 is an example of bar code labels attached to meter-rate priced articles; and FIGS. 7A and 7B are flowcharts for explaining the operation of the control circuit of FIG. 4.

DETAILED DESCRIPTION OF THE PREFERRED EMBODIMENT

A check-out device according to an embodiment of the present invention will now be explained, with reference to FIGS. 1 to 7B.

This check-out device is installed, for example, as a self-service check-out counter at a supermarket.

Figure 1:
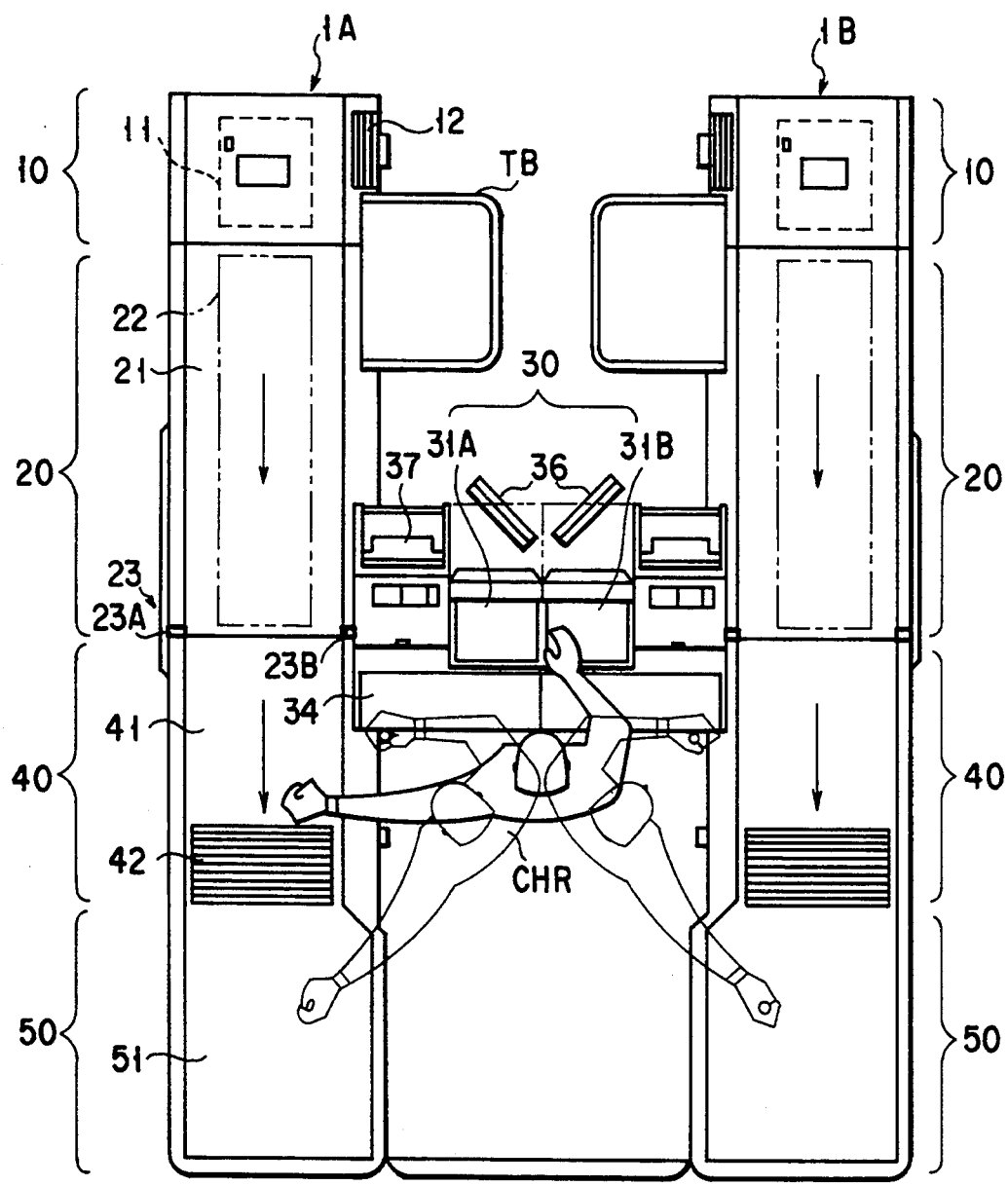
FIG. 1 is a top view of a check-out device according to an embodiment of the present invention, installed as a self-service check-out counter at a supermarket.

FIG. 1 is a top view of the check-out device. This check-out device includes two check-out lanes 1A and 1B arranged in parallel with each other. Each of the check-out lanes 1A and 1B includes an input section 10, an entry section 20, an outfeed section 40, and a stock section 50. The check-out device is further includes a settlement section 30 arranged between the check-out lanes 1A and 1B. The input section 10 contains a stationary scanner 11 for optically scanning an article, which a customer wishes to purchase, to read an article code and other data items recorded in a bar-code form on the article, an operation panel 12 used by the customer, and a shelf TB for temporarily holding articles whose code the scanner has failed to read. The operation panel 12 contains a display unit 14 for displaying a message for the customer, a start button 15 for requesting the start of article registration (or, article code input), a stop button 16 for requesting the stop of article registration, and a buzzer 17 for generating an alarm sound. The scanner 11 is set in an operable state upon operation of the start button and in a standby state upon operation of the stop button. The scanner 11 contains a reading circuit 11A for converting a scanning light beam reflected from the article into an electric signal. The operation of the reading circuit 11A can be temporarily interrupted even if the scanner 11 is set in the operable state. The entry section 20 contains an entry conveyor 21 for transporting an article whose article code has been read by the scanner 11, an electronic weighing device 22 for weighing an article put on the entry conveyor 21 to produce measured weight data corresponding to the measurement, and an article sensor 23 for optically sensing the article passing through an exit of the entry conveyor 21. The electronic weighing device 22 is arranged under the entry conveyor 21 in sliding contact therewith as shown in FIG. 2. The article sensor 23 is a photosensor made up of a light-emitting section 23A and a light-receiving section 23B mounted on both sides of and near the exit of the entry conveyor 21, and produces a detection signal after a light beam emitted from the section 23A to section 23B is interrupted for a preset period, the detection signal representing that an article has passed through the exit of the entry conveyor 21. The outfeed section 40 contains an outfeed conveyor 41 for transporting an article fed from the entry conveyor 21, and an inclined chute 42 for delivering an article fed from the outfeed conveyor 41 to a bagging area 51 in the stock section 50. The settlement section 30 includes electronic cash registers 31A and 31B which have the same construction and are arranged on the check-out lane 1A side and the check-out lane 1B side, respectively. The electronic cash register 31A is connected to the scanner 11 and the electronic weighing device 22 of the check-out lane 1A, and the electronic cash register 31B is connected to the scanner 11 and the electronic weighing device 22 of the check-out lane 1B. The electronic cash registers 31A and 31B are operated by a single cashier CHR. The settlement section 30 further contains first and second conveyor controllers 29, first and second foot switches 38, and first and second emergency stop switches 39. Each of the conveyor controllers 29 controls conveyance of articles on a corresponding one of the check-out lanes 1A and 1B. Each of the foot switches 38 is used to start the conveyor 21 of a corresponding one of the check-out lanes 1A and 1B. Each of the emergency switches 39 are used to stop the conveyers 21 and 41 of a corresponding one of the check-out lanes 1A and 1B. The position of the switches 38 and 39 is determined for the convenience of the cashier CHR. The first conveyor controller 29 operates on the basis of control signals from the electronic cash register 31A, the article sensor 23, the foot switch 38, and the emergency stop switch 39 of the check-out lane 1A. The second conveyor controller 29 operates on the basis of control signals from the electronic cash register 31B, the article sensor 23, the foot switch 38, and the emergency stop switch 39 of the check-out lane 1B. In each of the check-out lanes 1A and 1B, motors built in the conveyors 21 and 41 are started and stopped under the control of the corresponding conveyor controller 29. Normally, the entry conveyor 21 starts after it is confirmed that an article whose article code has been read by the scanner 11 is identical to one put on the entry conveyor 21, and stops after the article on the entry conveyor 21 has passed the article sensor 23. On the other hand, the outfeed conveyor 41 starts when the scanner 11 is set in the operable state, and stops when the scanner is set in the standby state.

Next, the check-out procedure will be explained briefly. Articles to be purchased are put in a shopping cart and carried to, for example, the check-out lane 1A. Here, a customer depresses the start button 15 on the operation panel 12 to start registering all the articles. Thereafter, the customer takes out an article from the shopping cart, set it in front of the scanner 11 to input the article code attached to the article, and puts the article on the entry conveyor 21 arranged over the electronic weighing device 22. After the article is optically scanned to read the article code, the scanner 11 supplies the read article code to the electronic cash register 31A. The electronic weighing device 23 measures the weight of the article on the entry conveyor 21 and supplies the weight as measured weight data to the electronic cash register 31A. After receiving the read article code and the measured weight data, the electronic cash register 31A verifies that an article whose article code is read is identical to one on the entry conveyor 21, and then registers this article as a purchased article using the read article code. In the meantime, the article is transported to the bagging area 51 by means of the entry conveyor 21, the outfeed conveyor 41, and the inclined chute 42. After all the articles to be purchased are scanned, the customer depresses the stop button 16 on the operation panel 12 to finish the article registration. The cashier operates the electronic cash register 31A to perform a settlement processing of the registered articles, informs the customer of the total amount of the registered articles obtained as a result of the settlement processing, and stores cash paid by the customer in the electronic cash register 31. After payment, the customer bags the articles stocked at the bagging area 51 and leaves the counter.

During the article registration and settlement, each of the electronic cash registers 31A and 31B controls the conveyor controller 29, the electronic weighing device 22, the scanner 11, and the operation panel 12. Hereinafter, the construction of the electronic cash register 31A will be explained in more detail, and the explanation of the construction of the electronic cash register 31B will be omitted because it has the same construction as the former.

As shown in FIG. 3, the electronic cash register 31A includes a keyboard 32, a handy scanner 33, a drawer 34, an operator display 35, a customer display 36, and a printer 37. The keyboard 32 and handy scanner 33 are used for the cashier to input article codes that the scanner has failed to read. The keyboard 32 has numeral keys, a close key, a total key, a discount key, and other keys. The displays 35 and 36 display article data of each of purchased articles, the total amount of the purchased articles, and the like. The drawer 34 stores cash paid by the customer for the purchased articles. The printer 37 issues a receipt on which the names, the unit prices, the total amount, and the like of the purchased articles are printed.

Figure 4:
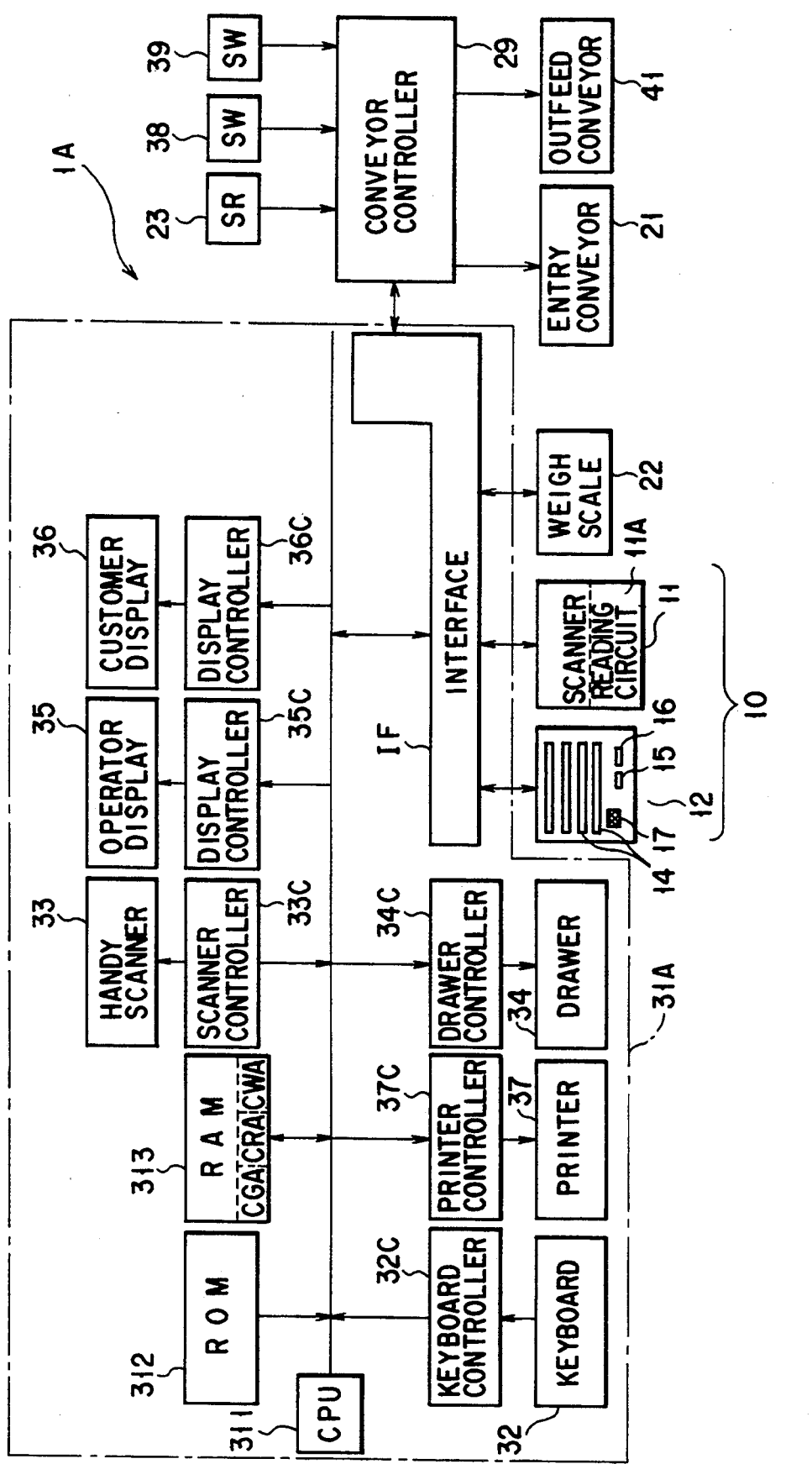
FIG. 4 is a block diagram showing the control circuit of the check-out device of FIG. 1.

As shown in FIG. 4, the electronic cash register 31A further includes a CPU 311, a ROM 312, a RAM 313, an interface IF, a keyboard controller 32C, a scanner controller 33C, a drawer controller 34C, a display controller 35C, a display controller 36C, and a printer controller 37C, which are interconnected to each other by means of a bus line. The CPU 311 performs various data processes to control the entire operation of the cash register 31A and the check-out lane 1A. Under the control of the CPU 311, the cash register 31A is operable in any one of a setting mode, a registration mode, an inspection mode, and a settlement mode, which are conventionally known. The article registration and settlement described above are performed when the registration mode is selected. The CPU 311 is connected to the keyboard 32, the handy scanner 33, the drawer 34, the operator display 35, the customer display 36, and the printer 37, via the controllers 32C, 33C, 34C, 35C, 36C, and 37C, respectively. The CPU 311 is also connected to the operation panel 12, the scanner 11, the electronic weighing device 22, and the conveyor controller 29, via the interface IF. The interface IF contains a circuit that enables data transfer with an external computer or a magnetic disk apparatus (not shown). The ROM 312 stores fixed data including a control program of the CPU 311, print character fonts, and display character fonts. The RAM 313 stores various data input to and output from the CPU 311. Particularly, the RAM 313 contains a memory area CGA for storing an article data table listing the article data of all the articles for sale, a memory area CRA for storing an article data table listing the article data of all the articles for sale, a memory area CRA for storing a sales data table listing the sales data of all the articles for sale, and a memory area CWA for storing work data such as read article codes, measured weight data, and article data of registered articles. Each article data item includes an article code, an article name, a unit price, and a reference weight. Each sales data item includes the number of sales and the amount of sales. The article data table is supplied from an external computer or a magnetic disk apparatus, and preset in the area CGA of the RAM 313 as shown in FIG. 5. In this embodiment, meter-rated articles have a bar code label 100 shown in FIG. 6, for example. The bar code label 100 contains a first bar code 101 indicating an article code and a second bar code 102 indicating data of a reference weight equal to the sum of the net weight and the weight of the packaging material, and the price data obtained by multiplying the net weight by the unit price. In FIG. 6, an article code of 49401257, a total weight of 252 g, and a price of 1000 yen are shown in character and bar-code forms. Further, the CPU 311 performs a control of inhibiting the reading circuit 11A of the scanner 11 from operating after an article code has been read from an article until the passing of the article is sensed by the article sensor 23, so that the scanner 11 would not input the next article code.

The operation of the check-out device will be described with reference to FIGS. 7A and 7B.

Figure 7A:
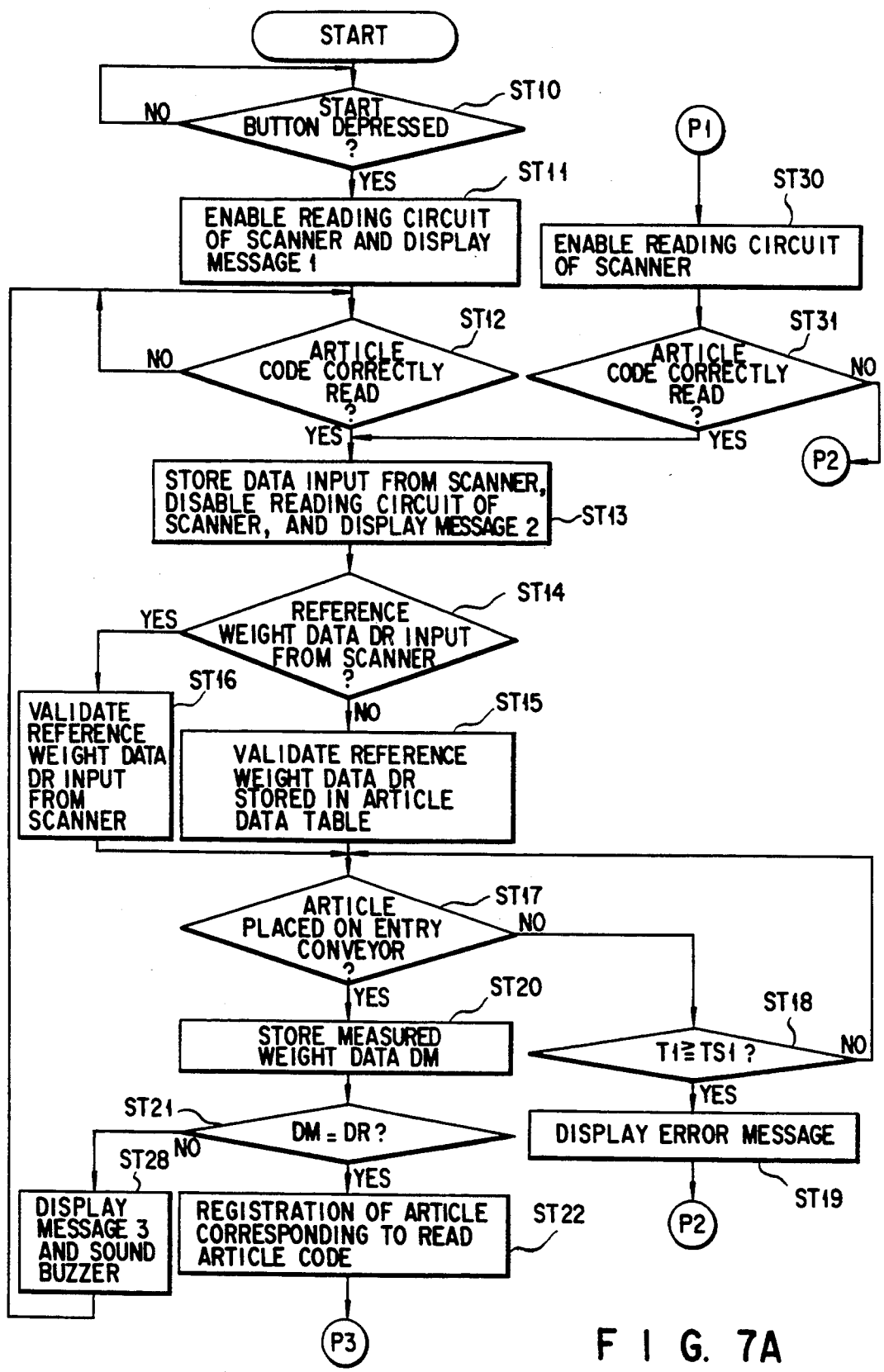

FIGS. 7A and 7B show a registration processing of articles to be purchased. After putting articles to be purchased in a cart, a customer brings the cart to the input section 10 of the check-out lane 1A and depresses the start button 15. When the start button 15 is detected to be depressed in step ST10, the CPU 311 enables the reading circuit 11A of the scanner 11 in step ST11 and causes the display 14 to display a message 1 of "PLEASE SCAN ARTICLE", in step ST11. When the customer set an article in front of the scanner 11, an article code and other data are read from the article by the scanner 11, and supplied to the electronic cash register 31A.

After it is confirmed in step ST12 that the article code is correctly read by the scanner 11, the CPU 311 stores the article code and other data from the scanner 11 in the area CWA of the RAM 312 in step ST13. At this time, the article data corresponding to the read article code is retrieved from the article data table stored in the area CGA of the RAM 313 and is temporarily stored in the area CWA. In step ST13, the display 14 further displays a message 2 of "CHECKING OF READ DATA: PLEASE PUT THIS ARTICLE ON ENTRY CONVEYOR". Thereafter, the CPU 311 checks in step ST14 to see if reference weight data DR has been input from the scanner 11. If not, reference weight data DR stored in and retrieved from the article data table and is validated in step ST15. In contrast, if it is detected that reference weight data DR has been input from the scanner 11, the input reference weight data DR is validated with priority, in step ST16. As a result, the input reference weight data DR is substituted for one retrieved from the article data table and stored in the area CWA of the RAM 313. After step ST15 or ST16, measured weight data DM from the electronic weighing device 22 is checked in step ST17 to see if an article put on the entry conveyor 21 is present. If not, the CPU 311 checks to see if the elapsed time TI after reading an article code has exceeded a preset time TS1 in step ST18. If true, the CPU 311 executes step ST19 to delete the article data corresponding to the read article code from the area CWA and display an error message, and then executes step ST29 explained later. If false, step ST17 is executed again.

After it is verified in step ST17 that an article put on the entry conveyor 21 is present, the measured weight data DM is temporarily stored in the area CWA of the RAM 313 in step ST20. In step ST21, the weight data DM is compared with the validated reference weight data DR stored in the area CWA. More specifically, it is checked whether a difference between the weight data items DM and DR falls within a predetermined range. If it is detected that substantially DM=DR, the CPU 311 determines that the article whose article code has been read is identical to one put on the entry conveyor 21, registers the article using the read article code in step ST22, and then supplies a driving signal to the conveyor controller 29 to start the entry conveyor 21. Accordingly, the entry conveyor 21 transports the article thereon toward the outfeed conveyor 41.

In contrast, if DM≠DR is detected, the CPU 311 deletes the article data corresponding to the read article code from the area CWA and causes the display 14 to display a message 3 of "PLEASE REMOVE THIS ARTICLE FROM ENTRY CONVEYOR AND SCAN IT AGAIN" in step ST28. Thereafter, step ST1 is executed again. In this case, the entry conveyor 21 is not operated.

After step ST23, it is checked in step ST24 to see if the sensor has sensed an article passing through the exit of the entry conveyor 21. When the sensor 23 has sensed the article, the CPU 311 controls the conveyor controller 29 to stop the entry conveyor 21 in step ST25, and then causes the display 14 to display a message 4 of "PLEASE SCAN THE NEXT ARTICLE OR DEPRESS STOP BUTTON". Thereafter, the CPU 311 repeatedly executes steps ST29, ST30, and ST31 until either the stop button 16 is depressed or the next article code is read. The stop button 16 is depressed after article codes of all the articles to be purchased have been input. When the operation of the stop button 16 is detected in step ST29, the CPU 311 terminates the input of the article codes.

If the sensor 23 cannot sense an article passing through the exit of the entry conveyor 21 in step ST24, the CPU 311 further checks in step ST18 to see if the elapsed time TI after the reading of the article code has exceeded a preset time TS2. If true, the CPU 311 executes step ST27 to display an error message, and then executes step ST29. If false, step ST24 is executed again.

After all the purchased articles have been registered in this way, the cashier makes sure that the customer has moved from the input section 10 to the settlement section 30 and then operates the keyboard 32 to instruct the CPU 311 to perform the settlement processing of the registered articles. In the settlement processing, the CPU 311 obtains sales data such as the number of sales, the amount of sales, and the like, based on the article data of the registered articles, stores those sales data in the area CRA of the RAM 313, and displays them on the display 36. The customer pays the cashier the amount of sales displayed. If the shelf TB has articles put thereon due to failure occurred in article code reading, the customer carries the articles to the settlement section 30 and hands them to the cashier. The cashier inputs article codes of the articles by means of the keyboard 32 or the scanner 33. After payment, the customer bags the articles stocked in the bagging area 51.

With the above-described embodiment, the reading circuit 11A of the scanner 11 is disabled after confirming that the article code has been read, and enabled again after confirming that the article has passed the exit of the entry conveyor 21. Since this prevents two or more articles from being put on the entry conveyor 21 and weighed simultaneously, a smooth and quick check-out can be attained.

The entry conveyor 21 is driven after the article registration is finished. Therefore, since the electronic weighing device 22 is not affected by vibrations caused by the driving of the entry conveyor 21, it is possible to weigh an article precisely.

Since reading of the subsequent article code is inhibited until the entry conveyor 21 has finished transporting an article, the customer neither has to do an unnecessary scanning act nor suspects that the scanning of the article has been invalid.

Further, the check-out device is constructed so as to display a message telling us whether the scanner 11 is in a state available for article code reading or not. Therefore, it is possible to start the scanning of the next article without unnecessarily delay.

The check-out device of this embodiment is constructed in such a manner that when the scanner 11 has read an article code and reference weight data recorded in a bar-code form, this reference weight data is given priority in article weight check independently of the reference weight data stored in the article data table. Therefore, the meter-rate priced articles can be registered without the cashier's help. In other words, the check-out device enables more kinds of articles to be scanned by the customer.

The present invention is not limited to the abovementioned embodiment, and various modifications can be made without departing from the scope of the present invention.

In the embodiment, the CPU 311 inhibits the next article code from being input during a period from when the scanner 11 has read an article code from an article until the article is removed from the entry conveyor 21, by disabling the reading circuit 11A of the scanner 11. Therefore, the next article code would not be read by the scanner 11 during the period. The CPU 311 can be programmed such that supply of the next article code from the scanner 11 to the electronic cash register 31A is interrupted during the period, without disabling the reading circuit 11A. Further, the CPU 311 can be programmed to disable a light source from which a light beam is generated to scan an article, in order that the next article code is inhibited from being input.

What is claimed is:

1. A check-out device comprising:
    reading means for reading an article code recorded on an article;
    conveyor means for conveying the article put thereon after the article code is read by said reading means;
    weighing means for measuring the weight of the article put on said conveyor means;
    electronic cash register means for storing reference weights assigned to various articles along with article codes assigned to the various articles, for comparing the weight measured by said weighing means with a reference weight of an article corresponding to the read article code, and for performing registration and settlement of the article corresponding to the read article code when it is detected from a result of comparison that the article corresponding to the read article code is identical to one put on said conveyor means; and
    inhibiting means for inhibiting a next article code from being read at least during a period of time from when the article code has been read until the article put on said conveyor means is removed from said conveyor means.

2. A check-out device according to claim 1, wherein said inhibiting means includes:
    sensor means for detecting that the article on the conveyor means has passed through an exit of the conveyor means, and
    control means for disabling said reading means upon reading of the article code, and for thereafter enabling said reading means upon detection from the sensor means indicating that the article has passed through the exit of the conveyor means.

3. A check-out device according to claim 2, wherein said inhibiting means further includes notifying means for notifying that reading of a next article code is not acceptable when said reading means is disabled, and that reading of the next article code is acceptable when said reading means is enabled.

4. A check-out device according to claim 3, wherein said electronic cash register means includes checking means for checking whether a difference between the reference weight and the measured weight for a given article on the conveyor means falls within a predetermined range.

5. A check-out device according to claim 4, wherein said conveyor means includes a conveyor driven after registration of the article corresponding to the read article code.

6. A check-out device according to claim 1, wherein said reading means includes means for reading an article code and other data from an article.

7. A check-out device according to claim 6, wherein said inhibiting means includes:
    changing means for detecting that a reference weight is read as the other data from the article by said reading means, and for causing the reference weight read from the article to be compared with the weight measured by said weighing means, instead of the reference weight data corresponding to the weighed article stored in said electronic cash register means.

8. A check-out device comprising:
    reading means for reading an article code and a reference weight recorded on the article;
    conveyor means for conveying the article put thereon after the article code is read by said reading means;
    weighing means for measuring the weight of the article put on said conveyor means;
    electronic cash register means for storing reference weights assigned to various articles along with article codes assigned to the various articles, for comparing the weight measured by said weighing means with a reference weight of an article corresponding to the read article code, and for performing registration and settlement of the article corresponding to the read article code when it is detected from a result of comparison that the article corresponding to the read article code is identical to one put on said conveyor means; and
    changing means for detecting that a reference weight is read by said reading means, and for causing the read reference weight to be compared with the weight measured by said weighing means, instead of the reference weight data corresponding to the weighted article stored in said electronic cash register means.

* * * * *